(12) United States Patent
Liu et al.

(10) Patent No.: US 10,858,264 B2
(45) Date of Patent: Dec. 8, 2020

(54) METHOD FOR PREPARING NICKEL/MANGANESE/LITHIUM/COBALT SULFATE AND TRICOBALT TETRAOXIDE FROM BATTERY WASTES

(71) Applicant: Hunan Jinyuan New Materials Co., Ltd., Yiyang (CN)

(72) Inventors: Xunbing Liu, Yiyang (CN); Jianjun Ouyang, Yiyang (CN); Xijuan Liu, Yiyang (CN)

( * ) Notice: Subject to any disclaimer, the term of this patent is extended or adjusted under 35 U.S.C. 154(b) by 0 days.

(21) Appl. No.: 16/259,047

(22) Filed: Jan. 28, 2019

(65) Prior Publication Data
US 2019/0152797 A1 May 23, 2019

Related U.S. Application Data

(63) Continuation of application No. PCT/CN2017/103691, filed on Sep. 27, 2017.

(30) Foreign Application Priority Data

Oct. 31, 2016 (CN) .......................... 2016 1 0928519

(51) Int. Cl.
*C22B 26/12* (2006.01)
*C01G 51/10* (2006.01)
(Continued)

(52) U.S. Cl.
CPC .......... *C01G 51/10* (2013.01); *B01D 9/0031* (2013.01); *B01D 9/0059* (2013.01);
(Continued)

(58) Field of Classification Search
None
See application file for complete search history.

(56) References Cited

U.S. PATENT DOCUMENTS

3,980,754 A * 9/1976 Otsuki ..................... C01D 7/26
                                                          423/185
8,945,275 B2   2/2015 Sonu et al.
2009/0038440 A1 2/2009 Outotec Oyi

FOREIGN PATENT DOCUMENTS

CN        101289703 A  * 10/2008
CN        102088124 A    6/2011
(Continued)

OTHER PUBLICATIONS

Internation Search Report of PCT/CN2017/103691, dated Jan. 4, 2018.

*Primary Examiner* — Melissa S Swain
(74) *Attorney, Agent, or Firm* — Erson IP (Nelson IP)

(57) ABSTRACT

A method for preparing nickel/manganese/lithium/cobalt sulfate and tricobalt tetraoxide from battery wastes adopts the following process: dissolving battery wastes with acid, removing iron and aluminum, removing calcium, magnesium and copper, carrying extraction separation, and carrying out evaporative crystallization to prepare nickel sulfate, manganese sulfate, lithium sulfate, cobalt sulfate or/and tricobalt tetraoxide. By using the method, multiple metal elements, such as nickel, manganese, lithium and cobalt, can be simultaneously recovered from the battery wastes, the recovered products are high in purity and can reach battery grade, battery-grade tricobalt tetraoxide can also be directly produced. The method is simple in process, low in energy consumption and free in exhaust gas pollution, and can realize zero release of wastewater.

13 Claims, 2 Drawing Sheets

(51) Int. Cl.
  *B01D 9/00*    (2006.01)
  *B01D 37/00*   (2006.01)
  *C01G 53/10*   (2006.01)
  *C01D 15/06*   (2006.01)
  *C01D 15/08*   (2006.01)
  *C01G 51/04*   (2006.01)
  *C01G 45/10*   (2006.01)
  *B01D 11/04*   (2006.01)
  *C22B 7/00*    (2006.01)
  *C01D 5/00*    (2006.01)

(52) U.S. Cl.
  CPC .......... *B01D 11/0492* (2013.01); *B01D 37/00* (2013.01); *C01D 5/00* (2013.01); *C01D 15/06* (2013.01); *C01D 15/08* (2013.01); *C01G 45/10* (2013.01); *C01G 51/04* (2013.01); *C01G 53/10* (2013.01); *C22B 7/00* (2013.01); *C22B 7/007* (2013.01); *C22B 26/12* (2013.01); *B01D 11/0488* (2013.01); *B01D 2009/0086* (2013.01); *B01D 2257/30* (2013.01); *C01P 2004/61* (2013.01); *C01P 2006/11* (2013.01); *C01P 2006/80* (2013.01); *C01P 2006/82* (2013.01)

(56) References Cited

FOREIGN PATENT DOCUMENTS

| | | |
|---|---|---|
| CN | 102162034 A | 8/2011 |
| CN | 102492858 A | 6/2012 |
| CN | 103168107 A | 6/2013 |
| CN | 103326088 A | 9/2013 |
| CN | 103555954 A | 2/2014 |
| CN | 205543065 U | 8/2016 |
| CN | 107429313 A | 12/2017 |

* cited by examiner

METHOD FOR PREPARING NICKEL/MANGANESE/LITHIUM/COBALT SULFATE AND TRICOBALT TETRAOXIDE FROM BATTERY WASTES

CROSS-REFERENCE TO RELATED APPLICATIONS

This application is a continuation of International Patent Application No. PCT/CN2017/103691 with a filing date of Sep. 27, 2017, designating the United States, now pending, and further claims priority to Chinese Patent Application No. 201610928519.5 with a filing date of Oct. 31, 2016. The content of the aforementioned applications, including any intervening amendments thereto, are incorporated herein by reference.

TECHNICAL FIELD

The disclosure relates to comprehensive utilization of battery wastes, particularly relates to a method for producing battery-grade nickel sulfate, battery-grade manganese sulfate, battery-grade lithium sulfate, battery-grade cobalt sulfate and battery-grade tricobalt tetraoxide by comprehensively utilizing battery wastes.

BACKGROUND OF THE PRESENT INVENTION

In cyclic economy, a battery waste is a recyclable precious resource in which main valuable elements are cobalt, nickel, manganese and lithium. Previous treatment of such wastes is to recover cobalt and nickel therein. For example, a Chinese Patent Application No. 201110435394.X, entitled "METHOD FOR SEPARATING AND) ENRICHING NICKEL AND COBALT FROM BATTERY WASTE LEACHING SOLUTION", discloses a technology "METHOD FOR SEPARATING AND ENRICHING NICKEL AND COBALT FROM BATTERY WASTE LEACHING SOLUTION", comprising the following steps: (1) soaking battery wastes with acidic leaching solution, then carrying out solid-liquid separation to obtain liquid battery waste leaching solution, adding a reducing agent, whose molar mass is 1.3-1.5 times that of copper contained in the leaching solution, into the battery waste leaching solution in batch, then stirring, reacting for 25-35 min at a reaction temperature of 40-50° C., and then carrying out solid-liquid separation, wherein, the obtained solid phase is spongy copper having a mass percentage of 99.0~99.5%, and the obtained liquid phase is a liquid phase A; (2) regulating the pH value of the liquid phase A to 3.0~4.0 with sodium carbonate, then heating to 90~95° C., adding hydrogen peroxide or sodium hypochlorite into the liquid phase A, stirring and reacting to obtain a FeOOH precipitate, and then carrying out solid-liquid separation, wherein, the obtained liquid phase is a liquid phase B; (3) adding a vulcanizing agent, whose molar mass is 1.2~1.5 times that of nickel and cobalt in the liquid, phase B, into the liquid phase B, then stirring and reacting for 10~20 min, then carrying out solid-liquid separation, returning the obtained liquid phase back to step (1) for soaking the battery wastes, washing the obtained solid with the acidic leaching solution to obtain a sulfide precipitate, collecting the obtained washing liquid to be returned back to step (1) for soaking the battery wastes; and (4) mixing the sulfide precipitate with water to be prepared into a slurry having a solid-liquid mass ratio of 1:3, putting the slurry into a reaction kettle to be mechanically stirred for 15~30 min to prepare a pulp, adding mixed acid solution, whose mass is 1.5~2.0 times that of the sulfide precipitate, into the pulp, then stirring and reacting for 20~30 min, and then carrying out solid-liquid separation, wherein, the obtained liquid is nickel and cobalt enriching solution.

Foreign counterparts make some researches on how to comprehensive recycle of various valuable metals, for example, Chinese Patent Application from LS-Riguang Copper Refining Co., Ltd, entitled "METHOD FOR RECOVERING VALUABLE METALS FROM LITHIUM SECONDARY BATTERY WASTE" (application number is CN201180049594.X), discloses a technology "METHOD FOR RECOVERING VALUABLE METALS", comprising: digesting waste powder containing Co, Ni, Mn and Li in a liquid phase, purifying the obtained digestion solution and extracting a solvent to recover each of Co, Ni, Mn and Li, wherein, the digestion of the liquid phase is carried out using inorganic acid or a mixed solution of inorganic acid and hydrogen peroxide via two-step countercurrent digestion. The inorganic acid solution is sulfuric acid solution having a concentration of 240 g/L or higher, wherein, based on 1 L of the inorganic acid solution, hydrogen peroxide is used in an amount of no less than 20 g; wherein, in the two-step countercurrent digestion, first and second steps are each independently carried out for 4~6 hours at a temperature of 60~80° C.; wherein, the purification of the digestion solution is carried out by adding $CaCO_3$ to the digestion solution, regulating the pH of the digestion solution to 4.5~5.0 through addition of diluted NaOH solution into the digestion solution, then adding NaSH into the digestion solution and subsequently filtering the obtained solution; wherein, recovery of each of Co, Ni, Mn and Li is achieved as follows: extraction of each of Co, Ni, Mn and Li is carried out to obtain lithium-containing solution after the step of extracting Ni, thereby achieving mutually complete separation of the metals. The waste powder is powder obtained by cutting a solid waste into a proper size, the powder is firstly distributed and calcined so that an electrode active material is separated from a current collector, and other organic substances and a separator are volatilized. Subsequently, the obtained calcined solid is secondarily distributed and sorted through a combination of gravity sorting, magnetic sorting and the like to obtain expected waste powder.

In the prior art, Chinese Patent Application CN201110435394.X has the problems that valuable metals such as lithium and, manganese in a battery cannot be recycled; Chinese Patent Application CN201180049594.X has the shortages that a process flow is complicated, production cost is high, especially, preparation of battery waste powder is achieved by calcination, and thus energy consumption is high, exhaust gas, pollution exists, which is not beneficial to environmental, protection, or increases exhaust gas treatment cost. The objective of the disclosure is to solve the existing technical problems and disclose a method for preparing nickel/manganese/lithium/cobalt sulfate and tricobalt tetraoxide from battery waste so as to simultaneously recover multiple metals such as nickel, manganese, lithium and cobalt, with high recovered product, simple process, low energy consumption, no exhaust gas pollution and zero release of wastewater, and a product.

SUMMARY OF PRESENT INVENTION

The technical solution of the disclosure is as follows: provided is a method for preparing nickel/manganese/lithium/cobalt sulfate and tricobalt tetraoxide, comprising the following process flows: dissolving battery wastes with acid, removing iron and aluminum, removing calcium, magnesium and copper, carrying extraction separation, and carrying out evaporative crystallization to prepare nickel sulfate, manganese sulfate, lithium sulfate, cobalt sulfate or/and tricobalt tetraoxide.

Further, the battery wastes comprise all waste batteries whose shells are stripped, wastes from battery manufacture factories and clearing wastes.

Further, the dissolving battery wasters with acid is realized by adding acid in the battery wastes with a solid/liquid mass ratio of 1:(2-6), reacting and then filtering to obtain acid dissolved filtrate.

More further, the dissolving battery wasters with acid is realized by in an acid dissolution barrel, preparing sulfuric acid or hydrochloric acid into 0.5-4N, preferably, 1.0-3.5N, 1.5-3.0N and 2.0-2.5N; adding the battery wastes with a solid/liquid mass ratio of 1:(3-5) preferably, 1:4, controlling a temperature to 60-100° C., preferably, 65-95° C., 70-90° C., 75-85° C. and 80° C., and reacting for 0.5-4 h, preferably, 1.0-3.5 h, 1.5-3.0 h and 2.0-2.5 h; and filtering and washing so that filtrate is acid dissolved filtrate.

Further, the removing iron and aluminum is realized by adding calcium carbonate and sodium chlorate in acid dissolved solution, stirring and then adding sodium carbonate solution, and filtering to obtain iron-removing and aluminum-removing filtrate.

More further, the removing iron and aluminum is realized by pumping acid dissolved filtrate into an impurity-removing baffle, heating and stirring; controlling a temperature to 30~100° C., preferably in turn, 35-95° C., 40-90° C., 45-85° C., 50-80° C., 55-75° C. and 60-70° C., and adding 3~60 kg, preferably in turn, 5-50 kg, 10-45 kg, 15-40 kg, 20-35 kg and 25-30 kg, of light calcium carbonate per m$^3$; adding sodium chlorate in an amount which is 0.1-1.0 time, preferably in turn, 0.2-0.8 time, 0.3-0.7 time, 0.4-0.6 time and 0.5 time, that of divalent iron; stirring for 10~50 min, preferably in turn, 15-45 min, 20-40 min, 25-35 min and 30 min; regulating a pH value to 3.5~5.5, preferably, 4.0-5.0 and 4.5, with 0.5~2.0N, preferably, 1.0-1.5N, sodium carbonate solution; and filtering and washing, wherein, filtrate enters the next process, the washing liquid is used for preparing sodium carbonate solution, and a filter cake, as iron and aluminum residue, is harmlessly treated.

Further, the removing calcium, magnesium and copper is realized by adding sodium fluoride into the iron-removing and aluminum-removing filtrate, stirring and then adding sodium carbonate, and filtering to obtain pre-extraction solution.

More further, the removing calcium, magnesium and copper is realized by pumping iron-removing filtrate into a calcium and magnesium-removing baffle, heating and stirring; controlling a temperature to 30~100° C., preferably in turn, 35-95° C., 40-90° C., 45-85° C., 50-80° C., 55-75° C. and 60-70° C., and adding sodium fluorine whose mass is 2~15 times, preferably in turn, 3~12 times, 4~10 times, 5~9 times, 6~8 times and 7 times, total mass of calcium and magnesium; stirring for 10~90 min, preferably in turn, 20-80 min, 30-70 min, 40-60 min and 50 min; regulating pH to 4.0~7.0, preferably in turn, 5.0-6.0, with 0.5~2.0N, preferably, 1.0-1.5N, sodium carbonate; and filtering, and washing, wherein, filtrate, as pre-extraction solution, enters an extraction section, the washing liquid is used for preparing sodium carbonate solution, and a filter cake, as calcium, magnesium and copper residue, is separately treated.

Further, the extraction separation comprises the following steps:

a. separating a manganese element by extracting and stripping the pre-extraction solution to obtain high-purity and high-concentration anti-manganese liquid.

Further, the numbers of grade of extraction can be set as saponification being in grade 1, manganese extraction being in grade 9, washing being in grade 2, stripping being in grade 2 and organic regeneration being in grade 2.

Further, after being repeatedly used, the washing liquid is delivered to an acid dissolved workshop for preparing, acid; the regeneration liquid is returned back to be used as the washing liquid; extraction raffinate enters into the next, process.

b. separating a cobalt element by allowing extraction raffinate obtained after extraction of manganese to enter an extraction process for separating cobalt, extracting and stripping to obtain high-purity high-concentration anti-cobalt liquid.

Further, the numbers of grade of extraction can be set as saponification being in grade 1, cobalt extraction being in grade 5, washing being in grade 2, stripping being in grade 5, and organic regeneration being in grade 1.

Further, after being repeatedly used, the washing liquid is delivered to an acid dissolved workshop for preparing acid; the regeneration liquid is returned back to be used as the washing liquid; extraction raffinate enters into the next process.

c. separating a nickel element by allowing extraction raffinate obtained after extraction of cobalt to enter an extraction process for separating nickel, extracting and stripping to obtain high-purity high-concentration anti-nickel liquid.

Further, the numbers of grade of extraction can be set as saponification being in grade 1, grade extraction being in grade 5, washing being in grade 2, stripping being in grade 5, and organic regeneration being in, grade 1.

Further, after being repeatedly used, the washing liquid is delivered to an acid dissolved workshop for preparing, acid; the regeneration liquid returned back to be used as the washing liquid; extraction raffinate enters into an MVR evaporative crystallization process, sodium sulfate in the extraction raffinate is crystallized and separated adopting a heat crystallization method to achieve an objective of concentrating lithium sulfate.

More further, in the extraction, extracts are adopted as, follows:

saponification liquid: 0.5~2.0N sodium hydroxide solution;

organic composition of P204:TBP:kerosene=(10-20):(10-20):(80-60) (v/v);

the washing liquid: 0.5-6N hydrochloric acid;

the stripping liquid: 0.5-4N sulfuric acid;

the organic regeneration liquid: 0.5-6N hydrochloric acid.

Further, the evaporative crystallization adopts the following steps:

a. recovering manganese sulfate by extracting pre-extraction solution with a P204 extractant at first so that manganese in the solution is extracted to an organic phase, adding sulfuric acid into the organic phase for washing to obtain 150-200 g/L, preferably in turn, 170-195 g/L, 180-300 g/L, 180-190 g/L and 200 g/L, manganese-containing manganese sulfate solution, and carrying out evaporative crystallization and centrifugation on the solution to obtain a manganese sulfate product. The organic phase is regenerated via acid washing, saponification is carried out with caustic soda solution to restore activity to be recycled. A few amount of centrifugation mother liquor is added into the next-batch manganese sulfate solution for evaporative crystallization.

b. recovering cobalt sulfate by extracting P204 extraction raffinate obtained after extraction of manganese in the previous process with P507 so that cobalt in the solution is extracted to an organic phase, adding sulfuric acid into the organic phase for washing to obtain 80-130 g/L, preferably in turn, 90-120 g/L and 100-110 g/L, cobalt-containing cobalt sulfate solution, and carrying out evaporative crystallization and centrifugation on the solution to obtain a cobalt sulfate product. The organic phase is regenerated via acid washing, saponification is carried out with caustic soda solution to restore activity to be recycled. A few amount of centrifugation mother liquor is added into the next-batch manganese sulfate solution for evaporative crystallization. Alternatively, 80-130 g/L cobalt-containing cobalt sulfate solution is synthesized into hydroxy cobalt by using sodium hydroxide solution, after centrifuging, firing is carried out at 700-950° C., preferably 750-900° C. and 800-850° C. so as to prepare tricobalt tetraoxide.

c. recovering nickel sulfate by extracting P507 extraction raffinate obtained after extraction of cobalt in the previous process with P204 again so that nickel in the solution is extracted to an organic phase, adding sulfuric acid into the organic phase for washing to obtain 70-130 g/L, preferably in turn 80-125 g/L, 90-120 g/L and 100-110 g/L, nickel-containing nickel sulfate solution, and carrying out evaporative crystallization and centrifugation on the solution to obtain a nickel sulfate product. The organic phase, is regenerated via acid washing, saponification is carried out with caustic soda solution to restore activity to be recycled. A few amount of centrifugation mother liquor is added into the next-batch manganese sulfate solution for evaporative crystallization.

d. recovering sodium sulfate by evaporating P204 extraction raffinate obtained after extraction of nickel in the previous process with an MRV evaporative crystallization system to form sodium sulfate crystals, and carrying out centrifugal filtering to obtain an anhydrous sodium sulfate byproduct; and e. recovering lithium carbonate by adding saturated sodium carbonate solution into centrifugation mother liquor after recovery of sodium sulfate in step d to obtain a lithium carbonate precipitate, wherein, a reaction temperature is controlled to 60-100° C., preferably in turn, 65-95° C., 70-90° C., 75-85° C. and 80° C., and reaction lasts for 0.5-4 h, preferably in turn, 1.0-3.5 h, 1.5-3 h and 2.0-2.5 h; and carrying out centrifugal filtration on the precipitate, washing and drying to obtain a lithium carbonate product.

Further, tailwater and the washing liquid are returned back to an MVR evaporative crystallization system.

Further, after preheating feedstock, evaporated water is collected in a distilled water tank for the whole production system, thereby reducing production water and reaching requirements on zero release of industrial wastewater.

The disclosure has the beneficial effects that due to adoption of the above technical solution, multiple metal elements such as nickel, manganese and cobalt can be simultaneously recovered from battery wastes, and recovered products are high in purity and all can achieve battery grade. The method can also be used for directly producing battery-grade tricobalt tetraoxide, with simple process, low energy consumption, no exhaust gas pollution and zero release of wastewater.

PREFERRED EMBODIMENTS OF THE DISCLOSURE

Figure 1:
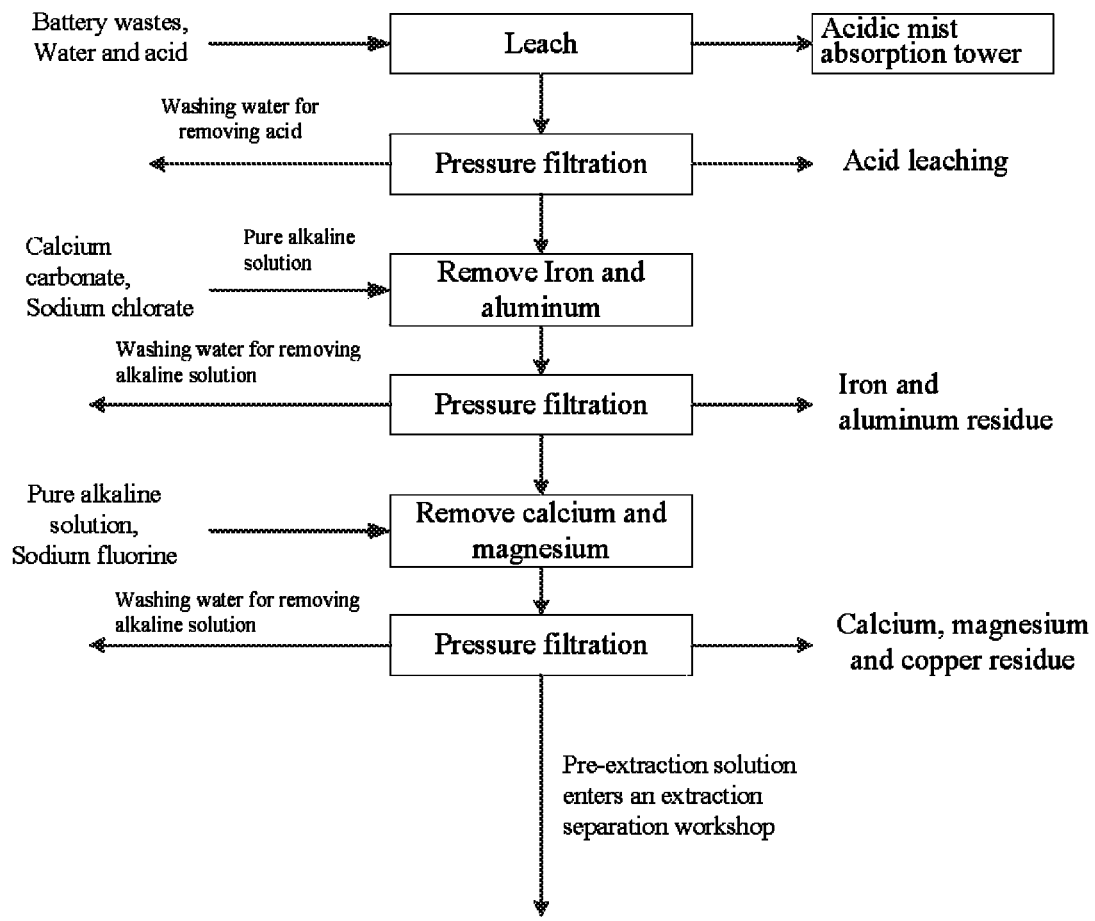
FIG. 1 is a process diagram of pre-extraction solution according to the disclosure.
Figure 2:
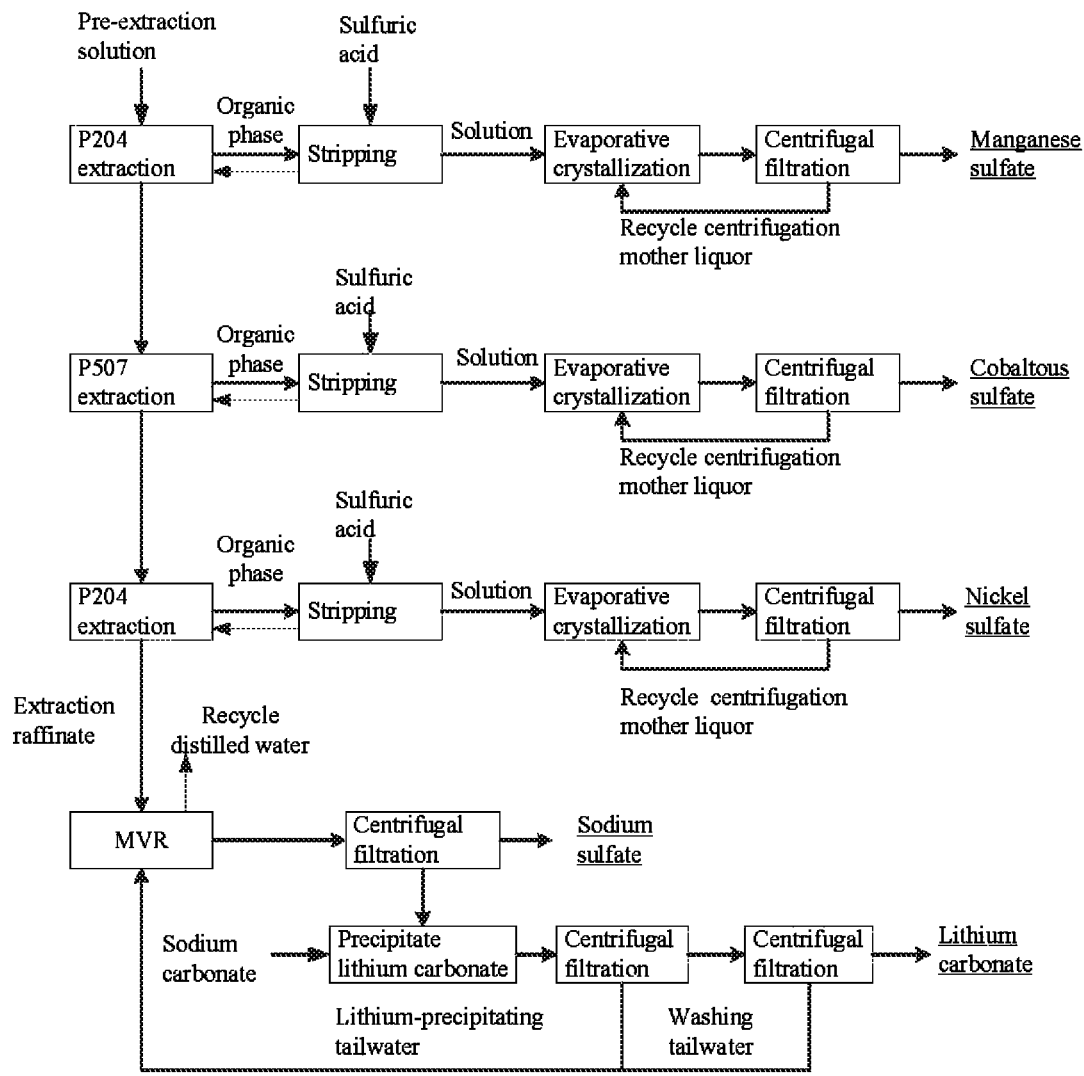
FIG. 2 is a process diagram of extraction and evaporative crystallization according to the disclosure.

Provided is a method for preparing nickel/manganese/lithium/cobalt sulfate and tricobalt tetraoxide from battery wastes, comprising the following steps:

1) dissolving battery-preparing wastes with acid: adding 9 m$^3$ washing water or clear water into a 20m$^3$ acid dissolved baffle, starting stirring, slowly adding 1 m$^3$ concentrated sulfuric acid, and slowly adding 4 tons of battery wastes; controlling a pH value to 0.5 with concentrated sulfuric acid or a material, and reacting for 3 h; and, filtering and washing, wherein, filtrate enters the next process, the washing liquid is returned back to an acid preparing process, and a filter cake is harmlessly treated.

2) removing iron and aluminum: pumping 10 m$^3$ acid solution into a 20 m$^3$ impurity-removing baffle, heating and stirring; controlling a temperature to 80° C., adding 120 kg of light calcium carbonate; adding sodium chlorate in an amount which is 0.35 time that of divalent iron in the solution; stirring for 30 min; regulating a pH value to 4.5 with 1.0N sodium carbonate solution; and filtering and washing, wherein, filtrate enters the next process, the washing liquid is used for preparing sodium carbonate solution, and a filter cake is harmlessly treated.

3) removing calcium, magnesium and copper: pumping 18 m$^3$ iron-removing, filtrate into a 20 m$^3$ calcium and magnesium-removing baffle, heating and stirring; controlling a temperature to 100° C., and adding sodium fluoride whose amount is 5 times total amount of calcium magnesium; stirring for 40 min; regulating pH to 5.5 with 0.5N sodium carbonate; and filtering and washing, wherein, filtrate, as pre-extraction solution, enters an extraction section, the washing liquid is used for preparing sodium carbonate solution, and a filter cake, as calcium, magnesium and copper residue, is separately treated.

4) carrying extraction separation, which adopts the following steps:

a. separating a manganese element by extracting and stripping the pre-extraction solution under the following conditions to obtain high-purity and high-concentration anti-manganese liquid; after being repeatedly used, delivering the washing liquid to an acid dissolution workshop for preparing acid; returning the regeneration liquid back to be used as the washing liquid; and allowing extraction raffinate to, enter the next process.

The numbers of grade of extraction can be set as saponification being in grade 1, manganese extraction being in grade 9, washing being in grade 2, stripping being in grade 5 and organic regeneration being in grade 2.

Saponification liquid: 2.0N sodium hydroxide solution; organic composition of P204:TBP:kerosene=15:15:70 (v/v); washing liquid: 4N hydrochloric acid; stripping liquid: 3N sulfuric acid; organic regeneration liquid: 6N hydrochloric acid.

b. separating a cobalt element by allowing extraction raffinate after extraction of manganese to enter an extraction process for separating cobalt, and extracting and stripping under the following conditions to obtain high-purity high-concentration anti-cobalt liquid; after being repeatedly used, delivering the washing liquid to an acid dissolved workshop for preparing acid; returning regeneration liquid back to be used as the washing liquid; and allowing extraction raffinate to enter the next process.

The numbers of grade of extraction can be set as: saponification being in grade 1, cobalt extraction being in grade 5, washing being in grade 2, stripping being in grade 5, and organic regeneration being in grade 1.

Saponification liquid: 2.0N sodium hydroxide solution; organic composition of P204:TBP:kerosene=20:20:60 (v/v); washing liquid: 4N hydrochloric acid; stripping liquid: 4N sulfuric acid; organic regeneration liquid: 6N hydrochloric acid.

c. separating a nickel element by allowing extraction raffinate obtained after extraction of cobalt to enter an extraction process for separating nickel, and extracting and stripping under the following conditions to obtain high-purity high-concentration anti-nickel liquid; after being repeatedly used, delivering the washing liquid to an acid dissolved workshop for preparing acid; allowing the regeneration liquid return to back to be used as the washing liquid; and allowing extraction raffinate to enter an MVR evaporative crystallization process, and crystallizing and separating sodium sulfate in the extraction raffinate adopting a heat crystallization to achieve an objective of concentrating lithium sulfate.

The numbers of grade of extraction can be set as saponification being in grade 1, cobalt extraction being in grade 5, washing being in grade 2, stripping being in grade 5, and organic regeneration being in grade 1.

Saponification liquid: 2.0N sodium hydroxide solution; organic composition of P204:TBP:kerosene=10:10:80 (v/v); the washing liquid: 3N hydrochloric acid; the stripping liquid: 3N sulfuric acid; the organic regeneration liquid: 6N hydrochloric acid.

5) carrying out evaporative crystallization, which adopts the following steps:

a. recovering manganese sulfate by extracting pre-extraction solution with a P204 extractant at first so that manganese in the solution is extracted to an organic phase, adding sulfuric acid into the organic phase for washing to obtain 200 g/L manganese-containing manganese sulfate solution, and carrying out evaporative crystallization and centrifugation on the solution to obtain a manganese sulfate product; regenerating the organic phase via acid washing, and saponifying with caustic soda solution to restore activity to be recycled; and adding a few amount of centrifugation mother liquor into the next-batch manganese sulfate solution for evaporative crystallization.

b. recovering cobalt sulfate by extracting P204 extraction raffinate obtained after extraction of manganese in the previous process with P507 so that cobalt in the solution is extracted to an organic phase, adding sulfuric acid into the organic phase for washing to obtain 110 g/L cobalt-containing cobalt sulfate solution, and carrying out evaporative crystallization and centrifugation on the solution to obtain a cobalt sulfate product; regenerating the organic phase via acid washing, and saponifying with caustic soda solution to restore activity to be recycled; and adding a few amount of centrifugation mother liquor into the next-batch manganese sulfate solution for evaporative crystallization; alternatively, synthesizing 110 g/L cobalt-containing cobalt sulfate solution into hydroxy cobalt with sodium hydroxide solution, and after centrifugal filtration, firing at 800° C. to prepare tricobalt tetraoxide.

c. recovering nickel sulfate by extracting P507 extraction raffinate obtained after extraction of cobalt in the previous process with P204 again so that nickel in the solution is extracted to an organic phase, adding sulfuric acid into the organic phase for washing to obtain 100 g/L nickel-containing nickel sulfate solution, and carrying out evaporative crystallization and centrifugation on the solution to obtain a nickel sulfate product; regenerating the organic phase via acid washing, and saponifying with caustic soda solution to restore activity to be recycled; and adding a few amount of centrifugation mother liquor into the next-batch manganese sulfate solution for evaporative crystallization.

d. recovering sodium sulfate and lithium carbonate: evaporating P204 extraction raffinate obtained after extraction of nickel in the previous process with an MRV evaporative crystallization system, wherein, the P204 extraction raffinate contains about 1-4 g/L lithium and about15-20 g/L sodium which, are present in the solution in forms of sodium sulfate and lithium carbonate, until the extraction raffinate contains 15-20 g/L lithium so as to generate a large amount of sodium sulfate crystals; and carrying out centrifugal filtration to obtain an anhydrous sodium sulfate byproduct.

e. recovering lithium sulfate: adding saturated sodium carbonate solution into centrifugation mother liquor, which is saturated sodium sulfate solution containing about 15 g/L lithium, of the sodium sulfate recovery process to obtain a lithium carbonate precipitate, wherein, a reaction temperature is controlled to100° C., and reaction time is 3 h; and carrying out centrifugal filtration on the precipitate, washing and drying to obtain a lithium carbonate product.

DETAILED DESCRIPTION OF PREFERRED EMBODIMENTS

The disclosure will be further described in combination with embodiments.

Example 1: a method for preparing nickel/manganese/lithium/cobalt sulfate and tricobalt tetraoxide from battery waste comprises the following steps:

1) dissolving battery-preparing wastes with acid: in an acid dissolved baffle, preparing sulfuric acid into 4N, and adding battery wastes in a solid-liquid mass ratio of 1:5; controlling a temperature to100° C., and reacting for 1 h; filtering and washing, wherein, filtrate enters the next process, the washing liquid is returned back to an acid preparing process, and a filter cake is harmlessly treated.

2) removing iron and aluminum: pumping acid solution into an impurity-removing baffle, heating and stirring; controlling a temperature to 80° C., adding 20 kg of light calcium carbonate per $m^3$; adding sodium chlorate in an amount which is 0.3 time that of divalent iron in the solution; stirring for 30 min; regulating a pH value to 3.5 with 1.0N sodium carbonate solution; and filtering and washing, wherein, filtrate enters the next process, the washing liquid is used for preparing sodium carbonate solution, and a filter cake is harmlessly treated.

3) removing calcium, magnesium and copper: pumping iron-removing filtrate into a calcium and magnesium-removing baffle, heating and stirring; controlling a temperature to 100° C., and adding sodium fluoride whose amount is 5 times total amount of calcium magnesium; stirring for 30 min; regulating pH to 5.5 with 0.5N sodium carbonate; and filtering and washing, wherein, filtrate, as pre-extraction solution, enters an extraction section, the washing liquid is used for preparing sodium carbonate solution; and a filter cake, as calcium, magnesium and copper residue, is separately treated.

4) carrying extraction separation, which adopts the following steps:

a. separating a manganese element by extracting and stripping the pre-extraction solution under the following conditions to obtain high-purity and high-concentration anti-manganese liquid; after being repeatedly used, allowing the washing liquid to enter an acid dissolution workshop for preparing acid; returning the regeneration liquid back to be used as the washing liquid; and allowing extraction raffinate to enter the next process.

The numbers of grade of extraction can be set as saponification in being grade 1, manganese extraction being in grade 9, washing being in grade 2, grade 5 stripping being in grade 5 and organic regeneration being in grade 2.

Saponification liquid: 2.0N sodium hydroxide solution; organic composition of P204:TBP:kerosene=10:10:80 (v/v); washing liquid: 2N hydrochloric acid; stripping liquid: 4N sulfuric acid; organic regeneration liquid: 6N hydrochloric acid.

b. separating a cobalt element by allowing extraction raffinate obtained after extraction of manganese to enter an extraction process for separating cobalt, and extracting and stripping under the following conditions to obtain high-purity high-concentration anti-cobalt liquid; after being repeatedly used, delivering the washing liquid to an acid dissolved workshop for preparing acid; returning regeneration liquid back to be used as the washing liquid; and allowing extraction raffinate to enter the next process.

The numbers of grade of extraction can be set as saponification being in grade 1, cobalt extraction being in grade 5, washing being in grade 2, stripping being in grade 5, and organic regeneration being in grade 1.

Saponification liquid: 2.0N sodium hydroxide solution; organic composition of P204:TBP:kerosene 15:15:70 (v/v); washing liquid: 6N hydrochloric acid; stripping liquid: 4N sulfuric acid; organic regeneration liquid: 6N hydrochloric acid.

c. separating a nickel element by allowing extraction raffinate obtained after extraction of cobalt to enter an extraction process for separating nickel, and extracting and stripping under the following conditions to obtain high-purity high-concentration anti-nickel liquid; after being repeatedly used, delivering the washing liquid to an acid dissolved workshop for preparing acid; returning the regeneration liquid back to be used as the washing liquid; and allowing extraction raffinate to enter an MVR evaporative crystallization process, and crystallizing and separating sodium sulfate in the extraction raffinate adopting a heat crystallization to achieve an objective of concentrating lithium sulfate.

The numbers of grade of extraction can be set as saponification being in grade 1, cobalt extraction being in grade 5, washing being in grade 2, stripping being in grade 5, and organic regeneration being in grade 1.

Saponification liquid: 1.0N sodium hydroxide solution; organic composition of P204:TBP:kerosene=15:15:70 (v/v); the washing liquid: 4N hydrochloric acid; the stripping liquid: 3N sulfuric acid; the organic regeneration liquid: 6N hydrochloric acid.

5) carrying out evaporative crystallization, which adopts the following steps:

a. recovering manganese sulfate by extracting pre-extraction solution with a P204 extractant at first so that manganese in the solution is extracted to an organic phase, adding sulfuric acid into the organic phase for washing to obtain 200 g/L manganese-containing manganese sulfate solution, and carrying out evaporative crystallization and centrifugation on the solution to obtain a manganese sulfate product; regenerating the organic phase via acid washing, and saponifying with caustic soda solution to restore activity to be recycled; and adding a few amount of centrifugation mother liquor into the next-batch manganese sulfate solution for evaporative crystallization.

b. recovering cobalt sulfate by extracting P204 extraction raffinate obtained after extraction of manganese in the previous process with P507 so that cobalt in the solution is extracted to an organic phase, adding sulfuric acid into the organic phase for washing to obtain 110 g/L cobalt-containing cobalt sulfate solution, and carrying out evaporative crystallization and centrifugation on the solution to obtain a cobalt sulfate product; regenerating the organic phase via acid washing, and saponifying with caustic soda solution to restore activity to be recycled; and adding a few amount of centrifugation mother liquor into the next-batch manganese sulfate solution for joint evaporative crystallization; alternatively, synthesizing 110 g/L cobalt-containing cobalt sulfate solution into hydroxy cobalt with sodium hydroxide solution, and after centrifuging, firing at 800° C. to prepare tricobalt tetraoxide.

c. recovering nickel sulfate by extracting P507 extraction raffinate obtained after extraction of cobalt in the previous process with P204 again so that nickel in the solution is extracted to an organic phase, adding sulfuric acid into the organic phase for washing to obtain 100 g/L nickel-containing nickel sulfate solution, and carrying out evaporative crystallization and centrifugation on the solution to obtain a nickel sulfate product; regenerating the organic phase via acid washing, and saponifying with caustic soda solution to restore activity to be recycled; and adding a few amount of centrifugation mother liquor into the next-batch manganese sulfate solution for joint evaporative crystallization.

d. recovering sodium sulfate and lithium carbonate: evaporating P204 extraction raffinate obtained after extraction of nickel in the previous process with an MRV evaporative crystallization system, wherein, the P204 extraction raffinate contains about 1-4 g/L lithium and about15-20 g/L sodium which are present in the solution in forms of sodium sulfate and lithium carbonate, until the extraction raffinate contains 15-20 g/L lithium so as to generate a large amount of sodium sulfate crystals; carrying out centrifugal filtration to obtain an anhydrous sodium sulfate byproduct.

e. recovering lithium carbonate by adding saturated sodium carbonate solution into centrifugation mother liquor, which is saturated sodium sulfate solution containing 15-20 g/L lithium, of the sodium sulfate recovery process to obtain a lithium carbonate precipitate, wherein, reaction temperature is controlled to 100° C., and reaction time is 3 h; and carrying out centrifugal filtration on the precipitate, washing and, drying to obtain a lithium carbonate product.

Example 2: a method for preparing nickel/manganese/lithium/cobalt sulfate and tricobalt tetraoxide from battery waste comprises the following steps:

1) dissolving battery waste with acid: in an acid dissolved baffle, preparing sulfuric acid into 4N, and adding battery wastes in a solid-liquid mass ratio of 1:5; controlling a temperature to 80° C., and reacting for 3 h; and filtering and washing, wherein, filtrate enters the next process, the washing liquid is returned back to an acid preparing process, and a filter cake is harmlessly treated.

2) removing iron and aluminum: pumping acid solution into an impurity-removing baffle, heating and stirring; controlling a temperature to 80° C., adding 50 kg of light calcium carbonate per $m^3$; adding sodium chlorate in an amount 0.5 time that of divalent iron in the solution; stirring for 30 min; regulating a pH value to 4.0 with 2.0N sodium carbonate solution; and filtering and washing, wherein, filtrate enters the next process, the washing liquid is used for preparing sodium carbonate solution, and a filter cake is harmlessly treated.

3) removing calcium, magnesium and copper: pumping iron-removing filtrate into a calcium and magnesium-removing baffle, heating and stirring; controlling a temperature to 100° C., and adding sodium fluoride whose amount is 6 times total amount of calcium magnesium; stirring, for 40 min; regulating pH to 5.0 with 1.0N sodium carbonate; and filtering and washing, wherein, filtrate, as pre-extraction solution, enters an extraction section, the washing liquid is used for preparing sodium carbonate solution, and separately treating a filter cake, as calcium, magnesium and copper residue, is separately treated.

4) carrying extraction separation, which adopts the following steps:

a. separating a manganese element by extracting and stripping the pre-extraction solution under the following conditions to obtain high-purity and high-concentration anti-manganese liquid; after being repeatedly used, allowing the washing liquid to enter an acid dissolution workshop for preparing acid; returning the regeneration liquid back to be used as the washing liquid; and allowing extraction raffinate to enter the next process.

The numbers of grade of extraction can be set as saponification being in grade 1, cobalt extraction being in grade 9, washing being in grade 2, stripping being in grade 5, and organic regeneration being in grade 2.

Saponification liquid: 0.5-2.0N sodium hydroxide solution; organic composition of P204:TBP:kerosene=20:20:60 (v/v); washing liquid: 4N hydrochloric acid; stripping liquid: 3N sulfuric acid; organic regeneration liquid: 6N hydrochloric acid.

b. separating a cobalt element by allowing extraction raffinate obtained after extraction of, manganese to enter an extraction process for separating cobalt, and extracting and stripping under the following conditions to obtain high-purity high-concentration anti-cobalt liquid; after being repeatedly used, delivering the washing liquid to an acid dissolved workshop for preparing acid; returning regeneration liquid back to be used as the washing liquid; and allowing extraction raffinate to enter the next process.

The numbers of grade of extraction can be set as saponification being in grade 1, cobalt extraction being in grade 5, washing being in grade 2, stripping being in grade 5, and organic regeneration being in grade 1.

Saponification liquid: 2.0N sodium hydroxide solution; organic composition of P507:TBP; kerosene=20:20:60 (v/v); washing liquid: 4N hydrochloric acid; stripping liquid: 4N sulfuric acid; organic regeneration liquid: 6N hydrochloric acid.

c. separating a nickel element by allowing extraction raffinate obtained after extraction of cobalt to enter an extraction process for separating nickel, and extracting and stripping under the following conditions to obtain high-purity high-concentration anti-nickel liquid; after being repeatedly used, delivering the washing liquid to an acid dissolved workshop for preparing acid; returning the regeneration liquid back to be used as the washing liquid; and allowing extraction raffinate to enter an MVR evaporative crystallization process, and crystallizing and separating sodium sulfate in the extraction raffinate adopting a heat crystallization to achieve an objective of concentrating lithium sulfate.

The numbers of grade of extraction can be set as saponification being in grade 1, cobalt extraction being in grade 5, washing being in grade 2, stripping being in grade 5, and organic regeneration being in grade 1.

Saponification liquid: 2.0N sodium hydroxide solution; organic composition of P204:TBP:kerosene=10:10:80 (v/v); the washing liquid: 3N hydrochloric acid; the stripping liquid: 3N sulfuric acid; the organic regeneration liquid: 6N hydrochloric acid.

5) carrying out evaporative crystallization, which adopts the following steps:

a. recovering manganese sulfate by extracting pre-extraction solution with a P204 extractant at first so that manganese in the solution is extracted to an organic phase, adding sulfuric acid into the organic phase for washing to obtain 200 g/L manganese-containing manganese sulfate solution, and carrying out evaporative crystallization and centrifugation on the solution to obtain a manganese sulfate product; regenerating the organic phase via acid washing, and saponifying with caustic soda solution to restore activity to be recycled; and adding a few amount of centrifugation mother liquor into the next-batch manganese sulfate solution for evaporative crystallization.

b. recovering cobalt sulfate by extracting P204 extraction raffinate obtained after extraction of manganese in the previous process with P507 so that cobalt in the solution is extracted to an organic phase, adding sulfuric acid into the organic phase for washing to obtain 110 g/L cobalt-containing cobalt sulfate solution, synthesizing hydroxy cobalt with sodium hydroxide solution, and after centrifuging, firing at 800° C. to prepare tricobalt tetraoxide.

c. recovering nickel sulfate by extracting P507 extraction raffinate obtained after extraction of cobalt in the previous process with P204 again so that nickel in the solution is extracted to an organic phase, adding sulfuric acid into the organic phase for washing to obtain 100 g/L nickel-containing nickel sulfate solution, and carrying out evaporative crystallization and centrifugation on the solution to obtain a nickel sulfate product; regenerating the organic phase via acid washing, and saponifying with caustic soda solution to restore activity to be recycled; and adding a few amount of centrifugation mother liquor into the next-batch manganese sulfate solution for evaporative crystallization.

d. recovering sodium sulfate by evaporating P204 extraction raffinate obtained after extraction of nickel in the previous process with an MRV evaporative crystallization system, wherein, the P204 extraction raffinate contains about 1-4 g/L lithium and about 15-20 g/L sodium which are present in the solution in forms of sodium sulfate and lithium carbonate, until the extraction raffinate contains 15-20 g/L lithium so as to generate a large amount of sodium sulfate crystals; and carrying out centrifugal filtration to obtain an anhydrous sodium sulfate byproduct.

e. recovering lithium carbonate by adding saturated sodium carbonate solution into centrifugation mother liquor, which is saturated sodium sulfate solution containing 15-20 g/L lithium, of the sodium sulfate recovery process to obtain a lithium carbonate precipitate, wherein, reaction temperature is controlled to 100° C., and reaction time is 2 h; and carrying out centrifugal filtration on the precipitate, washing and drying to obtain a lithium carbonate product.

Example 3: a method for preparing nickel/manganese/lithium/cobalt sulfate and tricobalt tetraoxide from battery waste comprises the following steps:

1) dissolving battery-preparing wastes with acid: adding 9 m$^3$ washing water or clear water into a 20 m$^3$ acid dissolved baffle, starting stirring, slowly adding 1 m$^3$ concentrated sulfuric acid, and slowly adding 4 tons of battery wastes; controlling a pH value to 0.5 with concentrated sulfuric acid or a material, and reacting for 3 h; and filtering and washing, wherein, filtrate enters the next process, the washing liquid is returned back to an acid preparing process, and a filter cake is harmlessly treated.

2) removing iron and aluminum: pumping 10 m³ acid solution into an 20 m³ impurity-removing baffle, heating and stirring; controlling a temperature to 80° C., adding 120 kg of light calcium carbonate; adding sodium chloride in an amount 0.35 time that of divalent iron in the solution; stirring for 30 min; regulating a pH value to 4.5 with 1.0N sodium carbonate solution; and filtering and washing, wherein, filtrate enters the next process, the washing liquid is used for preparing sodium carbonate solution, and a filter cake is harmlessly treated.

3) removing calcium, magnesium and copper: pumping 18 m³ iron-removing filtrate into a calcium and magnesium-removing baffle, heating and stirring; controlling a temperature to 100° C., and adding sodium fluoride whose amount is 4.5 times total amount of calcium magnesium; stirring for 40 min; regulating pH to 5.5 with 0.5N sodium carbonate; and filtering and washing, wherein, filtrate, as pre-extraction solution, enters an extraction process, the washing liquid is used for preparing sodium carbonate solution, and a filter cake, as calcium, magnesium and copper residue, is separately treated.

4) carrying extraction separation, which adopts the following steps:

a. separating a manganese element by extracting and stripping the pre-extraction solution under the following conditions to obtain high-purity and high-concentration anti-manganese liquid; after being repeatedly used, allowing the washing liquid to enter an acid dissolution workshop for preparing acid; returning the regeneration liquid back to be used as the washing liquid; and allowing extraction raffinate to enter the next process.

The numbers of grade of extraction can be set as saponification being in grade 1, cobalt extraction being in grade 9, washing being in grade 2, stripping being in grade 5, and organic regeneration being in grade 2.

Saponification liquid: 2.0N sodium hydroxide solution; organic composition of P204:TBP:kerosene=15:15:70 (v/v); washing liquid: 4N hydrochloric acid; stripping liquid: 3N sulfuric acid; organic regeneration liquid: 6N hydrochloric acid.

b. separating a cobalt element by allowing extraction raffinate obtained after extraction of, manganese to enter an extraction process for separating cobalt, and extracting and stripping under the following conditions to obtain high-purity high-concentration anti-cobalt liquid; after being repeatedly used, delivering the washing liquid to an acid dissolved workshop for preparing acid; returning regeneration liquid back to be used as the washing liquid; and allowing extraction raffinate to enter the next process.

The numbers of grade of extraction can be set as saponification being in grade 1, cobalt extraction being in grade 5, washing being in grade 2, stripping being in grade 5, and organic regeneration being in grade 1.

Saponification liquid: 2.0N sodium hydroxide solution; organic composition, of P507:TBP:kerosene=20:20:60 (v/v); washing liquid: 4N hydrochloric acid; stripping liquid: 4N sulfuric acid; organic regeneration liquid: 6N hydrochloric acid.

c. separating a nickel element by allowing extraction raffinate obtained after extraction cobalt to enter an extraction process for separating nickel, and extracting and stripping under the following conditions to obtain high-purity high-concentration anti-nickel liquid; after being repeatedly used, delivering the washing liquid to an acid dissolved workshop for preparing acid; returning the regeneration liquid back to be used as the washing liquid; and allowing extraction raffinate to enter an MVR evaporative crystallization process, and crystallizing and separating sodium sulfate in the extraction raffinate adopting a heat crystallization to achieve an objective of concentrating lithium sulfate.

The numbers of grade of extraction can be set as saponification being in grade 1, cobalt extraction being in grade 5, washing being in grade 2, stripping being in grade 5, and organic regeneration being in grade 1.

Saponification liquid: 2.0N sodium hydroxide solution; organic composition of P204:TBP:kerosene=10:10:80 (v/v); the washing liquid: 3N hydrochloric acid; the stripping liquid: 3N sulfuric acid; the organic regeneration liquid: 6N hydrochloric acid.

5) carrying out evaporative crystallization, which adopts the following steps:

a. recovering manganese sulfate by extracting pre-extraction solution with a P204 extractant at first so that manganese in the solution is extracted to an organic phase, adding sulfuric acid into the organic phase for washing to obtain 200 g/L manganese-containing manganese sulfate solution, and carrying out evaporative crystallization and centrifugation on the solution to obtain a manganese sulfate product; regenerating the organic phase via acid washing, and saponifying with caustic soda solution to restore activity to be recycled; and adding a few amount of centrifugation mother liquor into the next-batch manganese sulfate solution for evaporative crystallization.

b. recovering cobalt sulfate by extracting P204 extraction raffinate obtained after extraction of manganese in the previous process with P507 so that cobalt in the solution is extracted to an organic phase, adding sulfuric acid into the organic phase for washing to obtain 110 g/L cobalt-containing cobalt sulfate solution, carrying out evaporative crystallization and centrifugation on the solution to obtain a cobalt sulfate product; regenerating the organic phase via acid washing, and saponifying with caustic soda to restore activity to be recycled; adding a few amount of centrifugation mother liquor into the next-batch cobalt sulfate solution for joint evaporative crystallization; alternatively, synthesizing 110 g/L cobalt-containing cobalt sulfate solution into hydroxy cobalt with sodium hydroxide solution, and after centrifuging, firing at 800° C. to prepare tricobalt tetraoxide.

c. recovering nickel sulfate by extracting P507 extraction raffinate obtained after extraction of cobalt in the previous process with P204 again so that nickel in the solution is extracted to an organic phase, adding sulfuric acid into the organic phase for washing to obtain 100 g/L nickel-containing nickel sulfate solution, and carrying out evaporative crystallization and centrifugation on the solution to obtain a nickel sulfate product; regenerating the organic phase via acid washing, and saponifying with caustic soda solution to restore activity to be recycled; and adding a few amount of centrifugation mother liquor into the next-batch manganese sulfate solution for evaporative crystallization.

d. recovering sodium sulfate: evaporating P204 extraction raffinate obtained after extraction of nickel in the previous process with an MRV evaporative crystallization system, wherein, the P204 extraction raffinate contains about 1-4 g/L lithium and about 15-20 g/L sodium which are present in the solution in forms of sodium sulfate and lithium carbonate, until the extraction raffinate contains 15-20 g/L lithium so as to generate a large amount of sodium sulfate crystals; and carrying out centrifugal filtration to obtain an anhydrous, sodium sulfate byproduct.

e. recovering lithium carbonate by adding saturated sodium carbonate solution into centrifugation mother liquor, which is saturated sodium sulfate solution containing about 15 g/L lithium, of the sodium sulfate recovery process to obtain a lithium carbonate precipitate, wherein, reaction temperature is controlled to 100° C., and reaction time is 4 h; and carrying out centrifugal filtration on the precipitate, washing and drying to obtain a lithium carbonate product.

Embodiments of the disclosure are only limited to the above examples, each technological factor point within a parameter range and near a parameter range in the technical solution of the disclosure and technical features obtained by those skilled in the art via inference, expansion, permutation and combination are all included within the scope exemplified by embodiments of the disclosure.

Detection data of process flow at various stages in Examples of the disclosure is as follows:

| a. Detection Table of Battery wastes | | | | | | | | | |
|---|---|---|---|---|---|---|---|---|---|
| Items | Co | Ni | Mn | Li | Fe | Al | Cu | Ca | Mg |
| Battery wastes 1 (%) | 15.61 | 6.61 | 8.36 | 4.15 | 0.21 | 14.35 | 4.21 | 0.35 | 0.18 |
| Battery wastes 2 (%) | 24.35 | 0.21 | 0.18 | 4.56 | 0.35 | 15.21 | 3.86 | 0.44 | 0.24 |

| b. Acid Decomposition Process Detection | | | | | | | | | |
|---|---|---|---|---|---|---|---|---|---|
| Items | Co | Ni | Mn | Li | Fe | Al | Cu | Ca | Mg |
| Acid decomposition liquid g/L | 34.60 | 13.57 | 18.57 | 9.01 | 0.45 | 31.77 | 9.27 | 0.71 | 0.40 |
| Decomposition residue % | 0.32 | 0.15 | 0.11 | 0.10 | 0.14 | 0.21 | 0.12 | | |
| Leaching rate (%) | 98.3 | 99.1 | 99.3 | 98.10 | | | 97.40 | | |

| c. Iron-Removing and Aluminum-Removing Process Detection | | | | | | | | | |
|---|---|---|---|---|---|---|---|---|---|
| Items | Co | Ni | Mn | Li | Fe | Al | Cu | Ca | Mg |
| Iron-removing liquid g/L | 30.25 | 12.22 | 16.54 | 8.24 | 0.01 | 0.01 | 8.35 | | |
| Iron and Aluminum residue | 0.38 | 0.22 | 0.44 | 0.01 | 16.11 | 34.02 | 0.23 | | |

| d. Calcium/Magnesium/Copper-Removing Process Detection | | | | | | | | | |
|---|---|---|---|---|---|---|---|---|---|
| Items | Co | Ni | Mn | Li | Fe | Al | Cu | Ca | Mg |
| Pre-extraction solution g/L | 29.14 | 11.65 | 15.88 | 3.21 | 0.001 | 0.001 | 0.01 | 0.002 | 0.002 |
| Calcium and magnesium residue | 4.36 | 1.21 | 1.0 | 4.65 | 2.11 | 2.15 | 8.21 | 15.11 | 11.21 |

| e. Manganese-Extracting Process Detection | | | | | | | | | |
|---|---|---|---|---|---|---|---|---|---|
| Items | Co | Ni | Mn | Li | Fe | Al | Cu | Ca | Mg |
| Anti-manganese liquid g/L | 0.001 | 0.001 | 112.5 | 0.001 | 0.001 | 0.001 | 0.001 | 0.001 | 0.001 |
| Manganese extraction raffinate g/L | 28.15 | 11.11 | 0.001 | 2.55 | 0.001 | 0.001 | 0.001 | 0.001 | 0.001 |

| f. Cobalt-Extracting Process Detection | | | | | | | | | |
|---|---|---|---|---|---|---|---|---|---|
| Items | Co | Ni | Mn | Li | Fe | Al | Cu | Ca | Mg |
| Anti-cobalt liquid g/L | 110.2 | 10.50 | 0.001 | 0.001 | 0.001 | 0.001 | 0.001 | 0.001 | 0.001 |

| f. Cobalt-Extracting Process Detection | | | | | | | | | |
|---|---|---|---|---|---|---|---|---|---|
| Items | Co | Ni | Mn | Li | Fe | Al | Cu | Ca | Mg |
| Cobalt extraction raffinate g/L | 0.001 | 0.001 | 0.001 | 2.32 | 0.001 | 0.001 | 0.001 | 0.001 | 0.001 |

| g. Nickel-Extracting Process Detection | | | | | | | | | |
|---|---|---|---|---|---|---|---|---|---|
| Items | Co | Ni | Mn | Li | Fe | Al | Cu | Ca | Mg |
| Anti-nickel liquid g/L | 0.001 | 100.50 | 0.001 | 0.001 | 0.001 | 0.001 | 0.001 | 0.001 | 0.001 |
| Nickel extraction raffinate g/L | 0.001 | 0.001 | 0.001 | 2.22 | 0.001 | 0.001 | 0.001 | 0.001 | 0.001 |

| h. MVP Evaporative Crystallization Process Detection | | | | | | | | | |
|---|---|---|---|---|---|---|---|---|---|
| Items | Co | Ni | Mn | Li | Fe | Al | Cu | Ca | Mg |
| Concentrated mother liquor g/L | 0.01 | 0.01 | 0.01 | 20.15 | 0.01 | 0.01 | 0.01 | 0.01 | 0.01 |
| Anhydrous sodium sulfate % | 0.001 | 0.001 | 0.001 | 0.1 | 0.001 | 0.001 | 0.001 | 0.01 | 0.01 |
| Condensed water (%) | 0.001 | 0.001 | 0.001 | 0.001 | 0.001 | 0.001 | 0.001 | 0.001 | 0.001 |

INDUSTRIAL APPLICABILITY

According to the disclosure, through pilot scale test, the yield of cobalt is ≥95% the yield of nickel is ≥96%, and the yield of lithium is ≥90%.

| | Quality detection indexes of various products after a pilot scale test in the disclosure | | | | | | | | |
|---|---|---|---|---|---|---|---|---|---|
| | Nickel sulfate | | Cobalt sulfate | | Manganese sulfate | | Lithium carbonate | | |
| Elements (%) | Standard | Product | Standard | Product | Standard | Product | Standard | Product | Note |
| Co | 0.05 | 0.005 | 20.50 | 20.52 | 0.0020 | 0.0010 | 0.0005 | 0.0005 | |
| Ni | 21.5 | 21.24 | 0.0010 | 0.0005 | 0.0020 | 0.002 | 0.0005 | 0.0001 | |
| Mn | 0.0005 | 0.0003 | 0.0005 | 0.0004 | 31.80 | 31.82 | 0.0005 | 0.0002 | |
| Cu | 0.0005 | 0.0001 | 0.0005 | 0.0002 | 0.0020 | 0.0008 | 0.0005 | 0.0002 | |
| Fe | 0.0005 | 0.0003 | 0.0005 | 0.0002 | 0.0005 | 0.0001 | 0.0005 | 0.0003 | |
| Al | 0.0005 | 0.0001 | 0.0005 | 0.0002 | 0.0005 | 0.0002 | 0.0001 | 0.0001 | |
| Na | 0.001 | 0.0005 | 0.0010 | 0.0005 | 0.001 | 0.0007 | 0.0010 | 0.0008 | |
| Mg | 0.0005 | 0.0001 | 0.0005 | 0.0002 | 0.0015 | 0.0006 | 0.0010 | 0.0005 | |
| Ca | 0.0005 | 0.0003 | 0.0005 | 0.0004 | 0.002 | 0.0008 | 0.0010 | 0.0005 | |
| Pb | 0.0001 | 0.0001 | 0.0001 | 0.0001 | 0.0020 | 0.0001 | 0.0005 | 0.0005 | |
| Cr | 0.0005 | 0.0002 | 0.0005 | 0.0001 | 0.0001 | 0.0001 | 0.0005 | 0.0004 | |
| Cd | 0.0005 | 0.0002 | 0.0005 | 0.0002 | 0.0001 | 0.0001 | 0.0005 | 0.0002 | |
| Zn | 0.0005 | 0.0003 | 0.0005 | 0.0003 | 0.0005 | 0.0001 | 0.0005 | 0.0003 | |

| Detection indexes of battery-grade tricobalt tetraoxide in the disclosure ||||
| --- | --- | --- | --- |
| Items | Detection name | Index | Detection result |
| Physical index | Appearance | Dark grey powder | Dark grey powder |
| | Central grain size D50 (μm) | 7.3 ± 0.5 | 7.71 |
| | Tap density T.D (g/m$^2$) | ≥2.30 | 2.31 |
| | Water content (%) | ≤0.080 | 0.044 |
| | Micromorphology | Spherical shape or spherical-like shape | Spherical shape or spherical-like shape |
| Magnetic foreign matters (ppm) | Fe + Ni + Cr + Zn | ≤2 | |

| Items | Detection name | Index | Detection result | Items | Detection name | Index | Detection result |
| --- | --- | --- | --- | --- | --- | --- | --- |
| Element content (%) | Cobalt (Co) | ≥72.8 | 72.98 | Element content (%) | Plumbum (Pb) | ≤0.003 | 0.0021 |
| | Copper (Cu) | ≤0.005 | 0.0004 | | Sodium (Na) | ≤0.005 | 0.0033 |
| | Calcium (Ca) | ≤0.01 | 0.0046 | | Chrome (Cr) | ≤0.002 | 0.0017 |
| | Manganese (Mn) | ≤0.002 | 0.0007 | | Zinc (Zn) | ≤0.005 | 0.0006 |
| | Nickel (Ni) | ≤0.005 | 0.0021 | | Chlorine (Cl) | ≤0.005 | 0.002 |
| | Ferrum (Fe) | ≤0.005 | 0.0035 | | Hydrargyrum (Hg) | ≤0.001 | 0.0008 |
| | Magnesium (Mg) | ≤0.005 | 0.0036 | | | | |

We claim:

1. A method for preparing, nickel sulfate, manganese sulfate, lithium sulfate, cobalt sulfate and tricobalt tetraoxide from battery wastes, comprising the following steps: dissolving battery waste with acid, removing iron and aluminum, removing calcium, magnesium and copper, carrying extraction separation, and carrying out, evaporative crystallization to prepare nickel sulfate, manganese sulfate, lithium sulfate, cobalt sulfate and tricobalt tetraoxide; wherein, the evaporative crystallization adopts the following steps:

recovering manganese sulfate by extracting pre-extraction solution with a di-2-ethylhexyl phosphoric acid extractant at first so that manganese in the solution is extracted to an organic phase, adding sulfuric acid solution into the organic phase for washing to obtain 150-200 g/L manganese-containing manganese sulfate solution, and carrying out evaporative crystallization and centrifugation on the solution to obtain a manganese sulfate product;

recovering cobalt sulfate by extracting di-2-ethylhexyl phosphoric acid extraction raffinate obtained after extraction of manganese in the previous process with mono(2-ethylhexyl) 2-ethylhexyl phosphonate so that cobalt in the solution is extracted to an organic phase, adding sulfuric acid solution into the organic phase for washing to obtain 80-130 g/L cobalt-containing cobalt sulfate solution, and carrying out evaporative crystallization and centrifugation on the solution to obtain a cobalt sulfate product;

recovering nickel sulfate by extracting mono(2-ethylhexyl) 2-ethylhexyl phosphonate extraction raffinate obtained after extraction of cobalt in the previous process with di-2-ethylhexyl phosphoric acid again so that nickel in the solution is extracted to an organic phase, adding sulfuric acid solution into the organic phase for washing to obtain 70-130 g/L nickel-containing nickel sulfate solution, and carrying out evaporative crystallization and centrifugation on the solution to obtain a nickel sulfate product;

recovering sodium sulfate by evaporating di-2-ethylhexyl phosphoric acid extraction raffinate obtained after extraction of nickel in the previous process with an MRV(mechanical vapor recompression) evaporative crystallization system to form sodium sulfate crystals, and carrying out centrifugal filtration to obtain an anhydrous sodium sulfate byproduct; and recovering lithium carbonate by adding saturated sodium carbonate solution into centrifugation mother liquor obtained after recovery of sodium sulfate to obtain a lithium carbonate precipitate, wherein, a reaction temperature is controlled to 60-100° C., and react lasts, for 0.5-4 h. carrying out centrifugal filtration on the precipitate, washing and drying to obtain a lithium carbonate product.

2. The method for preparing nickel sulfate, manganese sulfate, lithium sulfate, cobalt sulfate and tricobalt tetraoxide from battery wastes according to claim 1, wherein, the dissolving battery wasters with acid is realized by adding acid in the battery wastes with a solid/liquid mass ratio of 1:(2-6), reacting and then filtering to obtain acid dissolved filtrate.

3. The method for preparing nickel sulfate, manganese sulfate, lithium sulfate, cobalt sulfate and tricobalt tetraoxide from battery wastes according to claim 1, wherein, the removing iron and aluminum is realized by adding calcium carbonate and sodium chloride in acid dissolved solution, stirring and then adding sodium carbonate solution, and filtering to obtain iron-removing and aluminum-removing filtrate.

4. The method for preparing nickel sulfate, manganese sulfate, lithium sulfate, cobalt sulfate and tricobalt tetraoxide from battery wastes according to claim 1, wherein, the removing calcium, magnesium and copper is realized by adding sodium fluoride into the iron-removing and aluminum-removing filtrate, stirring and then adding sodium carbonate, and filtering to obtain pre-extraction solution.

5. The method for preparing nickel sulfate, manganese sulfate, lithium sulfate, cobalt sulfate and tricobalt tetraoxide from battery wastes according to claim 1, wherein, the extraction separation comprises the following steps:
   a. separating a manganese element by extracting and stripping the pre-extraction solution to obtain high-purity and high-concentration anti-manganese liquid;
   b. separating a cobalt element by allowing extraction raffinate obtained after extraction of manganese to enter an extraction process for separating cobalt, extracting and stripping to obtain high-purity high-concentration anti-cobalt liquid; and
   c. separating a nickel element by allowing extraction raffinate obtained after extraction of cobalt to enter an extraction process for separating nickel, extracting and stripping to obtain high-purity high-concentration anti-nickel liquid.

6. The method for preparing nickel sulfate, manganese sulfate, lithium sulfate, cobalt sulfate and tricobalt tetraoxide from battery wastes according to claim 5, wherein, a stripping liquid uses 0.5-4N sulfuric acid.

7. The method for preparing nickel sulfate, manganese sulfate, lithium sulfate, cobalt sulfate and tricobalt tetraoxide from battery wastes according to claim 1, wherein, in the step of recovering cobalt sulfate, after 80-130 g/L cobalt-containing cobalt sulfate solution is obtained, hydroxy cobalt is synthesized with sodium hydroxide solution, centrifugal filtration is carried out, and firing is carried out at 700-950° C. to prepare tricobalt tetraoxide.

8. The method for preparing nickel sulfate, manganese sulfate, lithium sulfate, cobalt sulfate and tricobalt tetraoxide from battery wastes according to claim 1, wherein, in the step of recovering manganese sulfate, the organic phase is regenerated via acid washing, saponification is carried out with caustic soda solution to restore activity to be recycled, and centrifugation mother liquor is added into the next-batch manganese sulfate solution for evaporative crystallization.

9. The method for preparing nickel sulfate, manganese sulfate, lithium sulfate, cobalt sulfate and tricobalt tetraoxide from battery wastes according to claim 1, wherein, in the step of recovering cobalt sulfate, the organic phase is regenerated via acid washing, saponification is carried out with caustic soda solution to restore activity to be recycled, and centrifugation mother liquor is added into the next-batch cobalt sulfate solution for evaporative crystallization.

10. The method for preparing nickel sulfate, manganese sulfate, lithium sulfate, cobalt sulfate and tricobalt tetraoxide from battery wastes according to claim 1, wherein, in the step of recovering nickel sulfate, the organic phase is regenerated via acid washing, saponification is carried out with caustic soda solution to restore activity to be recycled, and centrifugation mother liquor is added into the next nickel sulfate solution for evaporative crystallization.

11. The method for preparing nickel sulfate, manganese sulfate, lithium sulfate, cobalt sulfate and tricobalt tetraoxide from battery wastes according to claim 1, wherein, in the step of recovering lithium carbonate, the reaction temperature is controlled to 65-95° C., and the reaction time is 1.0-3.5 h.

12. The method for preparing nickel sulfate, manganese sulfate, lithium sulfate, cobalt sulfate and tricobalt tetraoxide from battery wastes according to claim 1, wherein, in the step of recovering lithium carbonate tailwater and washing liquid are returned back to the MVR evaporative crystallization system.

13. The method for preparing nickel sulfate, manganese sulfate, lithium sulfate, cobalt sulfate and tricobalt tetraoxide from battery wastes according to claim 1, wherein, the battery wastes comprise all waste batteries whose shells are stripped, wastes from battery manufacture factories and clearing wastes.

* * * * *